United States Patent
Wu et al.

(10) Patent No.: US 12,495,809 B2
(45) Date of Patent: Dec. 16, 2025

(54) LIQUID NITROGEN QUICK-FREEZING PRESERVATION METHOD FOR FRESH BAMBOO SHOOTS

(71) Applicant: China National Bamboo Research Center, Hangzhou (CN)

(72) Inventors: Liangru Wu, Hangzhou (CN); Jinlai Yang, Hangzhou (CN); Huimin Yang, Hangzhou (CN)

(73) Assignee: CHINA NATIONAL BAMBOO RESEARCH CENTER, Hangzhou (CN)

( * ) Notice: Subject to any disclaimer, the term of this patent is extended or adjusted under 35 U.S.C. 154(b) by 728 days.

(21) Appl. No.: 17/890,620

(22) Filed: Aug. 18, 2022

(65) Prior Publication Data
US 2023/0043870 A1 Feb. 9, 2023

(30) Foreign Application Priority Data
Jun. 18, 2021 (CN) .......................... 202110678233.7

(51) Int. Cl.
A23B 7/055 (2006.01)
A23B 2/57 (2025.01)
(Continued)

(52) U.S. Cl.
CPC .............. *A23B 7/055* (2013.01); *A23B 2/57* (2025.01); *A23B 2/733* (2025.01); *A23B 2/762* (2025.01);
(Continued)

(58) Field of Classification Search
CPC ....... A23B 7/055; A23B 7/015; A23B 7/0425; A23B 7/08; A23B 7/154; A23B 7/16;
(Continued)

(56) References Cited

U.S. PATENT DOCUMENTS

2023/0043870 A1* 2/2023 Wu .................. A23B 2/779

FOREIGN PATENT DOCUMENTS

| CN | 102948462 A | 3/2013 |
| CN | 104304411 A | 1/2015 |

(Continued)

OTHER PUBLICATIONS

Chen et al., CN 105211271 A, Jan. 6, 2016, English Translation.*
(Continued)

*Primary Examiner* — Stephanie A Kohler
(74) *Attorney, Agent, or Firm* — HAUPTMAN HAM, LLP

(57) ABSTRACT

A liquid nitrogen quick-freezing preservation method for fresh bamboo shoots. The method includes performing a coating treatment on cuts of fresh bamboo shoots, which reduces the moisture loss through the cuts, slows down the degree of lignification of the bamboo shoots, mitigates color changes at the cuts, inhibits excessively fast reproduction of microorganisms at the cuts and prevents invasion of microorganisms from the cuts, so that a decrease in nutritional value is reduced, the deterioration of the appearance quality of the bamboo shoots is mitigated, and the nutritional value and commodity value of the bamboo shoots are maintained. The method further includes an intermittent ultrasonic treatment on the fresh bamboo shoots, so that coating substances form films on the surfaces of the cuts more easily, preventing the fresh bamboo shoots from being eroded by microorganisms and preventing nutrient substances from being decomposed and utilized by the microorganisms.

7 Claims, 1 Drawing Sheet

(51) Int. Cl.
*A23B 2/733* (2025.01)
*A23B 2/762* (2025.01)
*A23B 2/779* (2025.01)
*A23B 7/015* (2006.01)
*A23B 7/04* (2006.01)
*A23B 7/08* (2006.01)
*A23B 7/154* (2006.01)
*A23B 7/16* (2006.01)

(52) U.S. Cl.
CPC .............. *A23B 2/779* (2025.01); *A23B 7/015* (2013.01); *A23B 7/0425* (2013.01); *A23B 7/08* (2013.01); *A23B 7/154* (2013.01); *A23B 7/16* (2013.01); *A23V 2002/00* (2013.01)

(58) Field of Classification Search
CPC ........... A23B 2/57; A23B 2/762; A23B 2/779; A23B 2/733
See application file for complete search history.

(56) References Cited

FOREIGN PATENT DOCUMENTS

| | | |
|---|---|---|
| CN | 105211271 A | 1/2016 |
| CN | 106942343 A | 7/2017 |

OTHER PUBLICATIONS

Bai et al., CN 102948462 A; Mar. 6, 2013, English Translation.*
Cao et al., CN 104304411 A; Jan. 28, 2015, Derwent Abstract.*
Chi et al., CN 106942343 A; Jul. 14, 2017, Derwent Abstract.*
Guo et al., CN 110959670 A; Apr. 7, 2020, Derwent Abstract.*
Li et al., CN 106235124 A, Dec. 21, 2016, Derwent Abstract.*
Search Report issued in corresponding Chinese Application No. 202110678233.7; mailed Apr. 18, 2022; 2 pgs.
First Office Action issued in corresponding Chinese Application No. 202110678233.7; mailed Apr. 26, 2022; 11 pgs.

* cited by examiner

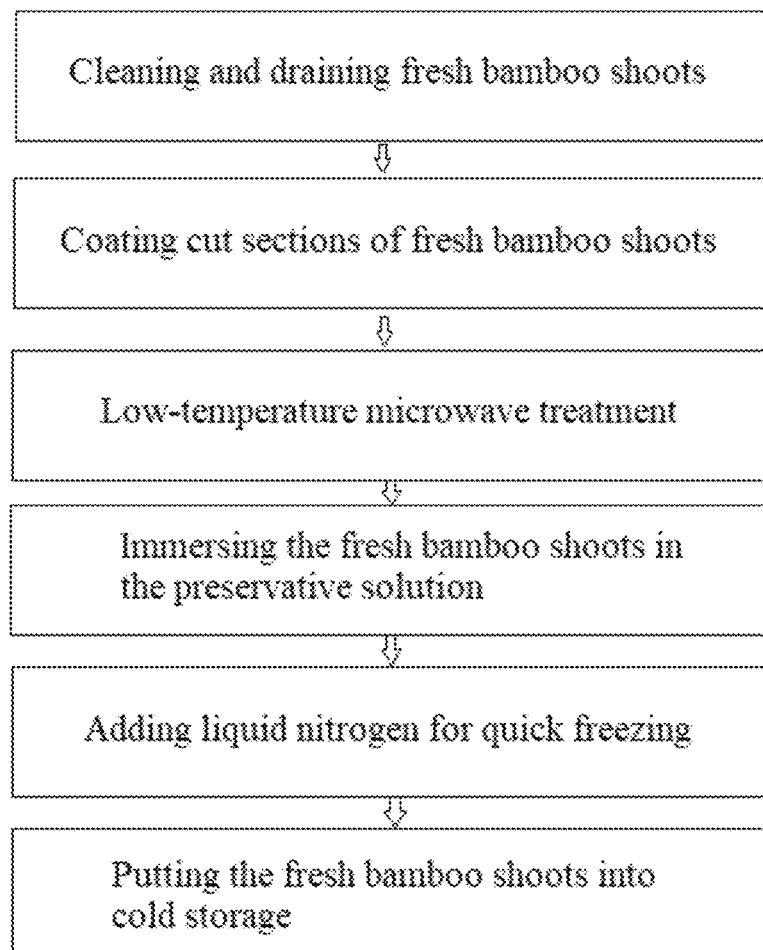

LIQUID NITROGEN QUICK-FREEZING PRESERVATION METHOD FOR FRESH BAMBOO SHOOTS

RELATED APPLICATIONS

The present application claims priority from Chinese Application Number 202110678233.7, filed Jun. 18, 2021, the disclosure of which is hereby incorporated by reference herein in its entirety.

TECHNICAL FIELD

The present invention belongs to the technical field of preservation of fresh agricultural products, and relates to the post-harvest physiology of bamboo shoots, in particular to a liquid nitrogen quick-freezing preservation method for fresh bamboo shoots.

BACKGROUND

Bamboo shoots are popular and nutritious special vegetables from forests, and contain 18 amino acids and various essential amino acids for a human body. The content of the amino acids in bamboo shoots is high, and the total amount of amino acids in 100 g of fresh bamboo shoots is about 2 g. Moreover, the bamboo shoots also contain various other essential trace elements for a human body. The bamboo shoots have the nutritional effects of stimulating appetite and tonifying spleen, loosening the chest and disinhibiting the diaphragm, relaxing bowels, opening the diaphragm and dissolving phlegm, enhancing body immunity and the like, as well as a certain dietary function. The bamboo shoots have been widely accepted by people.

Bamboo shoots are mainly produced to the south of the Yangtze River Basin in medium and high-temperature seasons. After or during harvesting, the weather is hot, the humidity is high, and the microorganisms become rampant; owning to special biological characteristics of the bamboo shoots, very big cuts will be left for most kinds of bamboo shoots during harvesting; the harvest periods of the bamboo shoots are also relatively centralized, and the geographic distribution is uneven. There are also the following problems in the bamboo shoots: the bamboo shoots are transported for a long distance to meet the demands of markets in other places, and the bamboo shoots harvested need to be preserved to extend the supply period in local markets.

In the past, investigators repeatedly explored the preservation of bamboo shoots, and obtained some preservation methods and technologies for the bamboo shoots. These methods and technologies have played a great role in later profound studies and in actual production. Cooked bamboo shoots are preserved with chemical preservative agents such as sodium erythorbate, citric acid, sodium pyrosulfite and sodium benzoate, as well as natural biological preservative agents such as tea polyphenols and phytic acid. The preservation agents prepared from a single variety or composite varieties such as food preservatives or antioxidants have played a positive role in regulating the market supply of the bamboo shoots. Fresh bamboo shoots are preserved by sulphur fumigation (not allowed now), controlled atmosphere storage, storing of low-temperature cold storage and other preservation technologies. Various bamboo shoot preservative agents or bamboo shoot preservation technologies focus on inhibiting the infection, growth and reproduction of microorganisms; in combination with temperature lowering, the probability of bamboo shoots being infected by microorganisms is reduced, or the growth and reproduction speed of the microorganisms on the bamboo shoots are inhibited after infection, the respiration of living cells of the bamboo shoots is maintained, the consumption of nutrients and the excessive loss of moisture caused by the respiration of the bamboo shoots are reduced, and the eating quality of the bamboo shoots is maintained as much as possible. However, most of the preservation technologies are the preservation technology of simulating fruits and vegetables with obvious maturity characteristics, the special biological properties of bamboo shoots are not considered really, and the preservation technology problem of maintaining the high eating quality and economic value of fresh bamboo shoots has not been solved very well.

Bamboo shoots are defined as expanded bamboo sprouts in terms of plant organs and anatomical structures, an embryonic form of a complete plant has been bred and differentiation of joints has been appeared; therefore, the vital activities of the bamboo shoots are especially vigorous before the bamboo shoots leave their mother plants. In addition to winter bamboo shoots and rhizome shoots, the harvested bamboo shoots similar to cones morphologically are cut and separated from their mother plants—bamboo rhizomes from the bottom of the cones; therefore, there are big cuts on the bamboo shoots harvested even using better technologies. The bamboo shoots grow on underground bamboo rhizomes, and are cut and separated from the bamboo rhizomes underground; as a result, microorganisms in the surrounding environment easily adhere to the cuts of the bamboo shoots. The above-mentioned particularity determines that more technical obstacles need to be overcome during the preservation of fresh bamboo shoots, and the difficulty is higher than that of the preservation of other fruits and vegetables. Moreover, the thawed bamboo shoots become soft in texture and taste bad.

Currently, the latest preservation technology of fresh bamboo shoots only focuses on inhibiting the lignification of harvested bamboo shoots and still utilizes a low-temperature environment to reduce a respiratory intensity of the bamboo shoots and activities of the microorganisms, without comprehensively considering the particularity of bamboo shoot preservation, especially without involving a preservation technology that controls the quality deterioration of the bamboo shoots by inhibiting wound respiration of the bamboo shoots. As the harvested bamboo shoots have large cut sections, the intensity of wound respiration is far greater than the intensity of respiration for maintaining basic vital activities of cells, and there is a great loss of nutrients caused by wound respiration, causing a decline in quality of the bamboo shoots; in addition, cell juice seeps out at the cuts, which is particularly suitable for the growth of the microorganisms and tends to cause relatively great decay losses; a lot of moisture is easily lost through the cuts, accelerating the quality deterioration of the bamboo shoots. The preservation technology that achieves the objectives of inhibiting wound respiration, reducing microorganism infection, reducing moisture loss and slowing down color change by a safe method for treating bamboo shoot cuts so as to maintain the eating quality of the bamboo shoots may be a revolutionary change in both the fundamental preservation method for bamboo shoots and the preservation technology for bamboo shoots or similar agricultural products.

For example, CN101744045A discloses a fresh bamboo shoot coating preservative agent prepared by edible materials, which is used for coating whole bamboo shoots. CN101849572A discloses a method for keeping freshness of bamboo shoots, which is used for storing cooked bamboo shoots. CN02125458.3 discloses a method for keeping freshness of bamboo shoots with sheaths, which is used for physical preservation by plasma. CN1726789 discloses a composite preservative agent for inhibiting the lignification of bamboo shoots and a method of use thereof. CN1965661B discloses a preparation method for tender bamboo shoot products without using a water-boiling method (products obtained through preservation by this method are also cooked bamboo shoots). CN101305746B discloses a preservation method for bamboo shoots pickled in sugar solution and low salt.

The problems existing in the above-mentioned prior arts are as follows: on one hand, the quality of bamboo shoots is reduced due to the treatment of complete bamboo shoots. Invasion or excessive multiplication of microorganisms that cause decay mainly occurs through susceptible parts—cuts. Therefore, the purpose of bacteria inhibition can be achieved basically if the invasion of microorganisms from cuts can be controlled, or the rapid reproduction of microorganisms at the cuts can be controlled.

On the other hand, stored bamboo shoots have actually become cooked bamboo shoots, and the quality of the bamboo shoots is obviously lower than that of fresh bamboo shoots. The reasons are that the bamboo shoots have been cooked in boiling water for a long time or sterilized at a high temperature for a long time, there are almost no living cells in the bamboo shoots, and there are no physiological and biochemical metabolic activities. At the moment, the bamboo shoots have lost their original textures, and there is a great loss of nutrients.

SUMMARY

The present invention is intended to solve the existing problems of a decline in the quality of bamboo shoots and a great loss of nutrients that are easily caused in the preservation of fresh bamboo shoots, and the problem that thawed bamboo shoots become soft in texture and taste bad. The present invention provides a liquid nitrogen quick-freezing preservation method for fresh bamboo shoots, which can maintain the quality and nutrition of the bamboo shoots, and enable the thawed bamboo shoots to be good in texture.

In order to achieve the above-mentioned purpose, the present invention adopts the following technical solution:

A liquid nitrogen quick-freezing preservation method for fresh bamboo shoots includes the following steps:
1) selecting cleaned and drained fresh bamboo shoots without other mechanical damages to bamboo shoot bodies except for cuts, and immersing cut sections of the bamboo shoots in a coating solution;
2) low-temperature microwave treatment: performing intermittent ultrasonic treatment at 0-4° C.;
3) immersing the whole fresh bamboo shoots in step 2) in a preservative solution;
4) putting the fresh bamboo shoots in step 3) into a container, and adding liquid nitrogen (controlling the temperature at −40° C. to −150° C.); and
5) putting the fresh bamboo shoots in step 4) into a cold storage for storing.

In the technical solution of the present invention, coating treatment is performed on cuts of the fresh bamboo shoots at first, so that the intensity of main post-harvest respiration-wound respiration of the bamboo shoots can be inhibited, thereby weakening metabolic consumption of bamboo shoot somatic cells, reducing the moisture loss through the cuts, slowing down the lignification of bamboo shoots, mitigating color changes at the cuts, inhibiting excessively fast reproduction of microorganisms at the cuts and preventing invasion of microorganisms from the cuts, so that a decrease in nutritional value is reduced, the deterioration of the appearance quality of bamboo shoots is mitigated, and the nutritional value and commodity value of bamboo shoots are kept to the maximum extent.

According to the present invention, intermittent ultrasonic treatment is performed on the fresh bamboo shoots so that coating substances can form films on the surfaces of the cuts more easily, thereby preventing the fresh bamboo shoots from being eroded by microorganisms and preventing nutrient substances from being decomposed and utilized by the microorganisms.

Preferably, in step 1), the coating solution contains 10-15% of sodium alginate, 0.3-0.5% of Kappa-Selenocarrageenan, 1.5-2.5% of *Leucobryum glaucum* extract, 3.2-4.5% of *Pyrrhobryum spiniforme* extract, and the remaining amount of water.

In the technical solution, the *Leucobryum glaucum* extract and *Pyrrhobryum spiniforme* extract are used in order to inhibit the growth of bacteria, and this is also natural and environmentally friendly.

Preferably, in step 2), the intermittent ultrasonic treatment refers to treating the bamboo shoots at 0-4° C. and an ultrasonic power of 450-500 W for 5-8 s, taking the bamboo shoots out and allowing standing for 10-15 min, and then treating the bamboo shoots at 550-650 W for 3-5 s; these steps form one cycle, and three cycles are repeated.

Preferably, in step 3), the preservative solution includes the following raw materials in parts by weight: 15-25 parts of water-soluble chitosan, 5-8 parts of serum protein, 1-3 parts of aspartic acid, 1-3 parts of vitamins, 20-40 parts of konjac gluocomannan degradation products, and 100-200 parts of water.

In the technical solution, serum protein serves as a carrier, used for loading aspartic acid and chitosan; chitosan has a film forming property and an antifungal property, so it can reduce transpiration of fresh bamboo shoots; chitosan also has certain selective permeability to gases, so it can prevent external oxygen from entering the film, increase the content of carbon dioxide in fresh bamboo shoot tissues and reduce ethylene escape, thereby reducing the respiratory and metabolic intensity of the fresh bamboo shoots, slowing down the maturation of the fresh bamboo shoots, and achieving the purposes of preservation and water retention. A hydroxyl group on a methylene group in a structure of carboxymethyl chitosan is utilized to react with a carboxyl group of aspartic acid to form an esterified product. The water retention property of the esterified product is significantly better than that of carboxymethyl chitosan, and it can be used to increase the compatibility with serum protein and prevent precipitation and agglomeration of serum protein. The konjac gluocomannan degradation products, existing in a form of viscous glucan particles, have various functional properties such as water absorbability, thickening, plasticity and water retention, and its water absorption capacity can reach 80-120 times as much as their own weights.

The preservative solution works in coordination with the coating solution to further weaken the metabolic consumption of bamboo shoot somatic cells, reduce the moisture loss through the cuts, slow down the degree of lignification of the bamboo shoots, mitigate color changes at the cuts, inhibit excessively fast reproduction of microorganisms at the cuts and prevent invasion of microorganisms from the cuts, thereby reducing a decrease in nutritional value.

Preferably, the serum protein is bovine serum albumin.

Preferably, the vitamins are vitamin C, vitamin E and beta-carotene mixed at a mass ratio of 1:0.875:0.625.

Preferably, in step 3), the 1000 g of fresh bamboo shoots are immersed in 1-3 L of preservative solution.

Preferably, in step 3), the fresh bamboo shoots are immersed in the preservative solution and placed at 0-4° C. and an ultrasonic frequency of 120-150 kHz for 10-20 min.

Preferably, in step 5), the fresh bamboo shoots are stored in the cold storage at −18~−20° C.

Preferably, the fresh bamboo shoots are thawed at 70° C. for 5 min by immersion in an alcoholic solution containing 0.8% (mass concentration) calcium lactate and 1.5% (mass concentration) *Bazzania trilobata* extract.

In the present technical solution, fresh bamboo shoots are usually thawed by direct water cooking in the prior art, but pulp of the fresh bamboo shoots cooked will become soft, making the taste bad. In the present invention, thawing refers to immersion of the fresh bamboo shoots in the alcoholic solution containing 0.8% (mass concentration) of calcium lactate and 1.5% (mass concentration) of *Bazzania trilobata* extract at 70° C. for 5 min, which improves the speed of thawing, increases the rupture strength of the fresh bamboo shoots, reduces the rupture deformation rate of the fresh bamboo shoots, mitigates the sponging, ensures the taste of the fresh bamboo shoots, and reduces the browning of the fresh bamboo shoots; the *Bazzania trilobata* extract is added to inhibit generation of bacteria.

Compared with the prior art, the present invention has the following advantages:
1) The preservation method of the present invention weakens the metabolic consumption of bamboo shoot somatic cells, reduces a moisture loss through the cuts, slows down a degree of lignification of the bamboo shoots, mitigates color changes at the cuts, inhibits excessively fast reproduction of microorganisms at the cuts and prevents invasion of microorganisms from the cuts, thereby reducing the decrease in nutritional value, reducing the deterioration of the appearance quality of the bamboo shoots, and keeping the nutritional value and commodity value of the bamboo shoots to the maximum extent;
2) The preservation method of the present invention improves the thawing speed, increases the rupture strength of the fresh bamboo shoots, reduces the rupture deformation rate of the fresh bamboo shoots, mitigates the sponging, ensures the taste of the fresh bamboo shoots, and reduces the browning of the fresh bamboo shoots.

BRIEF DESCRIPTION OF THE DRAWINGS

FIG. 1 shows a process flow chart of the present invention.

DETAILED DESCRIPTION OF THE EMBODIMENTS

In order to further describe the technical means adopted by the present invention and the effects of the technical means, the technical solution of the present invention will be further described below in combination with the preferred embodiments of the present invention, but the present invention is not limited to the scope of the embodiments.

The *Bazzania trilobata* extract, *Leucobryum glaucum* extract and *Pyrrhobryum spiniforme* extract used in the present invention are prepared by the following method:

Fresh *Bazzania trilobata*, *Leucobryum glaucum* and *Pyrrhobryum spiniforme* are collected and crushed by a pulverizer under a liquid nitrogen condition, the crushed *Bazzania trilobata*, *Leucobryum glaucum* and *Pyrrhobryum spiniforme* are ethanol-extracted with 95% ethanol and centrifuged, and the resulting supernatant is dried to obtain an extract.

Example 1

Referring to FIG. 1, this example provides a liquid nitrogen quick-freezing preservation method for fresh bamboo shoots, including the following steps:
1) cleaned and drained fresh bamboo shoots without other mechanical damages to bamboo shoot bodies except for cuts were selected, and 1-2 cm above cut sections of the fresh bamboo shoots were immersed in a coating solution; wherein the coating solution contained 10% of sodium alginate, 0.3% of Kappa-Selenocarrageenan, 1.5% of *Leucobryum glaucum* extract, 3.2% of *Pyrrhobryum spiniforme* extract, and the remaining amount of water;
2) low-temperature microwave treatment: intermittent ultrasonic treatment was performed at 0-4° C.; the intermittent ultrasonic treatment included the following steps: the bamboo shoots were treated at 0-4° C. and an ultrasonic power of 450 W for 5 s, taken out and allowed standing for 10 min, and then treated at 550 W for 3 s; these steps formed one cycle, and three cycles were repeated;
3) the whole fresh bamboo shoots in step 2) were immersed in a preservative solution; wherein 1000 g of fresh bamboo shoots were immersed in 1 L of preservative solution, and the preservative solution included the following raw materials in parts by weight: 15 parts of water-soluble chitosan, 5 parts of bovine serum albumin, 1 part of aspartic acid, 1 part of vitamins, 20 parts of konjac gluocomannan degradation products, and 100 parts of water; the vitamins were vitamin C, vitamin E and beta-carotene mixed at a mass ratio of 1:0.875:0.625; the fresh bamboo shoots were immersed in the preservative solution and placed at 0-4° C. and an ultrasonic frequency of 120 kHz for 10 min;
4) the fresh bamboo shoots in step 3) were put into a container, and liquid nitrogen was added; and
5) the fresh bamboo shoots in step 4) were put into a cold storage at −18~−20° C. for storing.

The fresh bamboo shoots were thawed by immersion in an alcoholic solution containing 0.8% (mass concentration) calcium lactate and 1.5% (mass concentration) *Bazzania trilobata* extract at 70° C. for 5 min.

Example 2

Referring to FIG. 1, this example provides a liquid nitrogen quick-freezing preservation method for fresh bamboo shoots, including the following steps:
1) cleaned and drained fresh bamboo shoots without other mechanical damages to bamboo shoot bodies except for cuts were selected, and 1-2 cm above cut sections of the fresh bamboo shoots were immersed in a coating solution; wherein the coating solution contained 12% of sodium alginate, 0.4% of Kappa-Selenocarrageenan, 1.8% of *Leucobryum glaucum* extract, 3.8% of *Pyrrhobryum spiniforme* extract, and the remaining amount of water;

2) low-temperature microwave treatment: intermittent ultrasonic treatment was performed at 0-4° C.; the intermittent ultrasonic treatment included the following steps: the bamboo shoots were treated at 0-4° C. and an ultrasonic power of 480 W for 7 s, taken out and allowed standing for 12 min, and then treated at 600 W for 4 s; these steps formed one cycle, and three cycles were repeated;
3) the whole fresh bamboo shoots in step 2) were immersed in a preservative solution; wherein 1000 g of fresh bamboo shoots were immersed in 2 L of preservative solution, and the preservative solution included the following raw materials in parts by weight: 20 parts of water-soluble chitosan, 6 parts of bovine serum albumin, 2 parts of aspartic acid, 2 parts of vitamins, 28 parts of konjac gluocomannan degradation products, and 120 parts of water; the vitamins were vitamin C, vitamin E and beta-carotene mixed at a mass ratio of 1:0.875:0.625; the fresh bamboo shoots were immersed in the preservative solution and placed at 0-4° C. and an ultrasonic frequency of 130 kHz for 15 min;
4) the fresh bamboo shoots in step 3) were put into a container, and liquid nitrogen was added; and
5) the fresh bamboo shoots in step 4) were put into a cold storage at −18∼−20° C. for storing.

The fresh bamboo shoots were thawed by immersion in an alcoholic solution containing 0.8% (mass concentration) calcium lactate and 1.5% (mass concentration) *Bazzania trilobata* extract at 70° C. for 5 min.

Example 3

Referring to FIG. 1, this example provides a liquid nitrogen quick-freezing preservation method for fresh bamboo shoots, including the following steps:

1) cleaned and drained fresh bamboo shoots without other mechanical damages to bamboo shoot bodies except for cuts were selected, and 1-2 cm above cut sections of the fresh bamboo shoots were immersed in a coating solution; wherein the coating solution contained 15% of sodium alginate, 0.5% of Kappa-Selenocarrageenan, 2.5% of *Leucobryum glaucum* extract, 4.5% of *Pyrrhobryum spiniforme* extract, and the remaining amount of water;
2) low-temperature microwave treatment: intermittent ultrasonic treatment was performed at 0-4° C.; the intermittent ultrasonic treatment included the following steps: the bamboo shoots were treated at 0-4° C. and an ultrasonic power of 500 W for 8 s, taken out and allowed standing for 15 min, and then treated at 650 W for 5 s; these steps formed one cycle, and three cycles were repeated;
3) the whole fresh bamboo shoots in step 2) were immersed in a preservative solution; wherein 1000 g of fresh bamboo shoots were immersed in 3 L of preservative solution, and the preservative solution included the following raw materials in parts by weight: 25 parts of water-soluble chitosan, 8 parts of bovine serum albumin, 3 parts of aspartic acid, 3 parts of vitamins, 40 parts of konjac gluocomannan degradation products, and 200 parts of water; the vitamins were vitamin C, vitamin E and beta-carotene mixed at a mass ratio of 1:0.875:0.625; the fresh bamboo shoots were immersed in the preservative solution and placed at 0-4° C. and an ultrasonic frequency of 150 kHz for 20 min;
4) the fresh bamboo shoots in step 3) were put into a container, and liquid nitrogen was added; and
5) the fresh bamboo shoots in step 4) were put into a cold storage at −18∼−24° C. for storing.

The fresh bamboo shoots were thawed by immersion in an alcoholic solution containing 0.8% (mass concentration) calcium lactate and 1.5% (mass concentration) *Bazzania trilobata* extract at 70° C. for 5 min.

Comparative Example 1: the fresh bamboo shoots were harvested, trimmed, frozen in liquid nitrogen directly, and put into a cold storage for storing.

Comparative Example 2: fresh bamboo shoots were harvested and put into a cold storage for storing directly.

The fresh bamboo shoots stored in examples 1-3 and comparative examples 1 and 2 were thawed and tested after 7 days, 24 days and 60 days respectively. The results are shown in Table 1.

TABLE 1

Test Results

| | Edible Rate/% | | | Protein/% | | | Enzymatic Activity of PPO (U/g · min) | | |
|---|---|---|---|---|---|---|---|---|---|
| | 7 d | 24 d | 60 d | 7 d | 24 d | 60 d | 7 d | 24 d | 60 d |
| Example 1 | 65.12 | 64.96 | 63.85 | 2.81 | 2.43 | 2.05 | 251.52 | 183.15 | 143.17 |
| Example 2 | 64.84 | 63.74 | 61.95 | 2.78 | 2.38 | 2.01 | 252.51 | 184.07 | 147.08 |
| Example 3 | 66.11 | 65.93 | 63.29 | 2.80 | 2.42 | 2.02 | 253.53 | 185.19 | 149.96 |
| Comparative Example 1 | 59.75 | 55.01 | 49.73 | 2.51 | 2.05 | 1.48 | 255.05 | 226.03 | 206.03 |
| Comparative Example 2 | 45.58 | 40.36 | 35.17 | 1.75 | 1.23 | 0.92 | 303.57 | 289.43 | 273.33 |

It will be seen from Table 1 that edible parts of the fresh bamboo shoots preserved by the methods of examples 1-3 remained stable above 60%, edible parts of the fresh bamboo shoots preserved by the methods of comparative examples 1 and 2 started to decline sharply after 7 days, indicating that a high edible rate can be maintained by the preservation method of the present invention;

No significant decrease was observed in protein contents of the fresh bamboo shoots preserved by the methods of examples 1-3 of the present invention, while the protein contents of the fresh bamboo shoots preserved by the methods of comparative examples 1 and 2 started to decline sharply after 7 days;

The enzymatic activity of PPO of the fresh bamboo shoots preserved by the methods of examples 1-3 of the present invention was obviously inhibited, indicating that the preservation method of the present invention reduced the browning speed of the fresh bamboo shoots.

The preservation method of the present invention weakens the metabolic consumption of bamboo shoot somatic cells, reduces the moisture loss through the cuts, slows down the degree of lignification of the bamboo shoots, mitigates color changes at the cuts, inhibits excessively fast reproduction of microorganisms at the cuts and prevents invasion of microorganisms from the cuts, thereby reducing the decrease in nutritional value, reducing the deterioration of appearance quality of the bamboo shoots, and keeping the nutritional value and commodity value of the bamboo shoots to the maximum extent; the preservation method of the present invention improves the thawing speed, increases the rupture strength of the fresh bamboo shoots, reduces the rupture deformation rate of the fresh bamboo shoots, mitigates the sponging, ensures the taste of the fresh bamboo shoots, and reduces the browning of the fresh bamboo shoots.

Those embodiments described above are only the preferred embodiments of the present invention, the protection scope of the present invention shall not be limited to these embodiments, and all technical solutions under the idea of the present invention shall fall into the protection scope of the present invention. It should be pointed out that some improvements and modifications may be made by those of ordinary skill in the art without departing from the principles of the present invention, and these improvements and modifications should also be regarded as the protection scope of the present invention.

The invention claimed is:

1. A method for preserving fresh bamboo shoots by quick-freezing with liquid nitrogen, comprising, in order, the steps of:
   1) Cleaning and draining fresh bamboo shoots;
   1a) cutting the fresh bamboo shoots into a plurality of bamboo shoot sections;
   1b) selecting bamboo shoot sections free from mechanical damage except for sectioning cuts;
   1c) immersing the selected bamboo shoot sections in an aqueous coating solution, wherein the coating solution consists essentially of 10-15% of sodium alginate, 0.3-0.5% of Kappa-Selenocarrageenan, 1.5-2.5% of *Leucobryum glaucum* extract, and 3.2-4.5% of *Pyrrhobryum spiniforme* extract; to obtain coated bamboo shoot sections;
   2) Cooling the coated bamboo shoot sections to a treatment temperature of 0-4° C. to obtain cooled bamboo shoot sections;
   2a) exposing the cooled bamboo shoot sections to 450-500 W of ultrasonic power for a first treatment period of 5-8 seconds in an ultrasonic vessel to obtain partially treated cooled bamboo shoot sections;
   2b) removing the partially treated cooled bamboo shoot sections from the ultrasonic vessel and allowing the partially treated cooled bamboo shoot sections to stand for 10-15 min;
   2c) placing the partially treated cooled bamboo shoot sections to an ultrasonic vessel and then treating the partially treated cooled bamboo shoots at 550-650 W for a second treatment period of 3-5 seconds;
   2d) repeating steps 2b)-2(c) for a total of three times to obtain fully treated cooled bamboo shoot sections;
   3) Immersing the fully treated cooled bamboo shoot sections from step 2d) in a preservative solution to obtain preserved bamboo shoot sections;
   wherein the preservative solution consists essentially of the following raw materials in parts by weight:
      15-25 parts of water-soluble chitosan, 5-8 parts of serum protein, 1-3 parts of aspartic acid, 1-3 parts of vitamins, 20-40 parts of konjac gluocomannan degradation products, and 100-200 parts of water;
   4) Putting the preserved bamboo shoot sections from step 3) into a container and adding liquid nitrogen to the container to obtain frozen preserved bamboo shoot sections; and
   5) storing the frozen preserved bamboo shoot sections from step 4) in a cold storage facility.

2. The liquid nitrogen quick-freezing preservation method for fresh bamboo shoots according to claim 1, wherein the serum protein is bovine serum albumin.

3. The liquid nitrogen quick-freezing preservation method for fresh bamboo shoots according to claim 1, wherein the vitamins comprise a mixture of vitamin C, vitamin E, and beta-carotene mixed at a mass ratio of 8:7:5.

4. The liquid nitrogen quick-freezing preservation method for fresh bamboo shoots according to claim 1, wherein in step 3), 1000 g of treated bamboo shoot sections are immersed in 1-3 L of the preservative solution.

5. The liquid nitrogen quick-freezing preservation method for fresh bamboo shoots according to claim 1, wherein step 3) further comprises
   immersing the treated bamboo shoot sections in the preservative solution,
   cooling the treated bamboo shoot sections to 0-4° C.,
   placing the treated bamboo shoot sections in the ultrasonic vessel, and
   exposing the treated bamboo shoot sections to an ultrasonic frequency of 120-150 kHz for a third treatment period of 10-20 min.

6. The liquid nitrogen quick-freezing preservation method for fresh bamboo shoots according to claim 1, wherein
   in step 4), the addition of the liquid nitrogen is controlled to obtain a temperature within the container of −40° C. to −150° C. while freezing the preserved bamboo shoot sections; and
   in step 5), the frozen preserved bamboo shoot sections are stored in the cold storage facility at −18° C. to −24° C.

7. The liquid nitrogen quick-freezing preservation method for fresh bamboo shoots according to claim 1,
   wherein the frozen preserved bamboo shoot sections are thawed by immersion at 70° C. for 5 min in an alcoholic solution containing 0.8% (mass concentration) of calcium lactate and 1.5% (mass concentration) of *Bazzania trilobata* extract.

* * * * *